United States Patent
Biscay

(10) Patent No.: US 7,572,088 B2
(45) Date of Patent: Aug. 11, 2009

(54) DEEP HOLE BORING HEAD AND DEEP HOLE BORING METHOD FOR BORING A PRODUCTION PIECE

(75) Inventor: Albert Biscay, Esquiule (FR)

(73) Assignee: Messier-Dowty S.A., Velizy Villacoublay (FR)

( * ) Notice: Subject to any disclaimer, the term of this patent is extended or adjusted under 35 U.S.C. 154(b) by 382 days.

(21) Appl. No.: 11/203,088

(22) Filed: Aug. 15, 2005

(65) Prior Publication Data

US 2006/0037783 A1 Feb. 23, 2006

(30) Foreign Application Priority Data

Aug. 17, 2004 (FR) .................................. 04 08917

(51) Int. Cl.
*B23B 51/06* (2006.01)

(52) U.S. Cl. .................. 408/59; 408/225; 408/705

(58) Field of Classification Search .................. 408/56, 408/57, 59, 225, 705; *B23B 51/06*
See application file for complete search history.

(56) References Cited

U.S. PATENT DOCUMENTS

| 1,940,220 | A |   | 12/1933 | McGrath |            |
|-----------|---|---|---------|---------|------------|
| 2,555,746 | A | * | 6/1951  | Horsky et al. | 408/59 |
| 3,191,463 | A | * | 6/1965  | Ladendorf | 408/59  |
| 3,502,124 | A | * | 3/1970  | Mater   | 408/56     |
| 3,737,245 | A | * | 6/1973  | Mater   | 408/225    |
| 3,738,765 | A | * | 6/1973  | Mater   | 408/37     |
| 4,032,250 | A | * | 6/1977  | Lavallee | 408/59    |
| 4,101,238 | A | * | 7/1978  | Reibetanz et al. | 408/59 |
| 4,356,873 | A | * | 11/1982 | Dziak   | 175/420.1  |
| 5,173,014 | A | * | 12/1992 | Agapiou et al. | 408/59 |
| 5,304,020 | A | * | 4/1994  | Reccius | 408/205    |
| 5,425,604 | A | * | 6/1995  | Scheer et al. | 408/83 |
| 5,584,617 | A | * | 12/1996 | Houser  | 408/1 R    |
| 6,086,292 | A | * | 7/2000  | Yokoyama | 408/67    |
| 6,095,725 | A | * | 8/2000  | Stahl   | 408/223    |
| 6,161,633 | A | * | 12/2000 | Broom   | 175/320    |
| 6,602,028 | B1 | * | 8/2003 | Lindblom et al. | 408/83 |
| 6,682,275 | B1 | * | 1/2004 | Lindblom et al. | 408/59 |
| 7,320,565 | B2 | * | 1/2008 | Danielsson et al. | 408/144 |
| 7,326,009 | B2 | * | 2/2008 | Lindblom | 408/59   |
| 2004/0101371 | A1 |  | 5/2004 | Arvidsson et al. |      |
| 2007/0086867 | A1 | * | 4/2007 | Kesterson et al. | 408/59 |

FOREIGN PATENT DOCUMENTS

DE 3522324 A1 1/1987

* cited by examiner

*Primary Examiner*—David P Bryant
*Assistant Examiner*—Eric A Gates
(74) *Attorney, Agent, or Firm*—Oblon, Spivak, McClelland, Maier & Neustadt, P.C.

(57) ABSTRACT

A deep hole boring head is provided which is capable of rotating about a central axis, a body whose front part has at least one cutting edge followed by a recess which leads to a duct inside the body, this duct allowing the chips formed during the boring to be cleared away rearwards, and includes at a front end thereof and at a center portion thereof a pilot drill bit capable of guiding the head during boring. Use for the boring of a production piece is made of titanium, the ratio L/D between the depth L of the hole bored and the diameter D of the latter being greater than or equal to 10, and the diameter D being greater than or equal to 65 mm.

11 Claims, 3 Drawing Sheets

DEEP HOLE BORING HEAD AND DEEP HOLE BORING METHOD FOR BORING A PRODUCTION PIECE

BACKGROUND OF THE INVENTION

1. Field of the Invention

The present invention relates to an improved deep hole boring head and a deep hole boring method for boring a production piece, and more particularly a production piece made of titanium.

2. Discussion of the Background

Deep hole boring differs from shallow hole boring, or from drilling, by the L/D ratio between the length L and the diameter D of the hole to be made. Thus, deep hole boring in the present specification means a boring method used to make holes having an L/D ratio greater than or equal to 10. With such an L/D ratio, it is particularly necessary to clear away the chips cut from the production piece during boring.

Also, it will be noted that the invention is more particularly intended for boring large diameter holes, usually greater than 40 mm and, preferably, greater than or equal to 65 mm.

Deep hole boring tools are already used for boring steel alloy pieces, such as 300M and 4340M alloy steels. These tools are formed of a rotary drive shaft, at the front end of which is mounted a deep hole boring head which comprises a body whose front face has at least one cutting edge followed by a recess which leads to a duct inside the said body, this duct allowing the chips formed during boring to be cleared away rearwards.

To make it easier to clear away the chips, limit the heating and reduce the friction between the boring head and the bottom of the hole made, a boring liquid, usually undiluted oil or oil that is soluble between 10 and 15%, is used.

The general shapes of the front and rear parts of the boring head have a symmetry of revolution relative to the central axis about which the head and the tool are rotated.

The rear part of the boring head and the drive shaft are hollow cylinders, the diameter of the drive shaft being less than or equal to the diameter of the rear part of the boring head. The latter diameter is furthermore less than the maximum diameter of the front part of the boring head, so that, during boring, there remains an annular space between the rear part of the boring head, the drive shaft, and the walls of the hole bored. This annular space, necessary for limiting the friction between the tool and the walls of the hole, is also used for bringing the boring liquid to the front part of the boring head. The liquid chip-laden is then cleared away via the internal duct passing through the rear part of the boring head and the drive shaft.

Because of this annular space, it is necessary to guide the boring head when it moves forward. For this purpose, it is a known practice to use three guide pads usually coated with carbide or Celoron (registered trademark) pads, that are evenly distributed and protrude from the outer lateral periphery of the rear part of the head, and that are intended to press against the walls of the hole formed during boring.

However, the boring heads known to date are unsuitable for boring titanium (Ti) pieces. Specifically, the titanium adheres to the guide pads, which causes the boring head to seize and it then becomes virtually impossible with the machines currently used in the boring field to develop a sufficiently high boring torque to continue rotating the head. Furthermore, premature wear of the guide pads is noted, which necessitates frequent replacement of the pads, while their price is high due to their specialist nature and the materials they are made of. Finally, because of these unsatisfactory boring conditions, the geometry of the hole made is so bad (in particular, significant deviations are observed relative to the boring axis) that it is very difficult, even impossible, to rectify it by machining. In addition, this subsequent machining step is made difficult by the presence of the carbide particles originating from the guide pads.

SUMMARY OF THE INVENTION

The object of the invention is to improve this prior art by providing a deep hole boring head particularly suitable for deep hole boring production pieces made of hard materials such as titanium.

To achieve this object, the subject of the invention is to provide a deep hole boring head capable of rotating about a central axis, comprising a body whose front part has at least one cutting edge followed by a recess which leads to a duct inside the said body, this duct allowing the chips formed during boring to be cleared away rearwards, and which comprises at a front end thereof and at a center portion thereof a pilot drill bit capable of guiding the head during boring to make the head follow the boring axis, which is usually the axis of the drive shaft of the means for rotating the boring head.

The presence of the pilot drill bit, or centering bit, makes it possible to dispense with the presence of the guide pads and the problems associated with the titanium sticking to these pads. Consequently, the boring torque necessary to rotate the head during boring is sufficiently low so as to be able to be developed by machines widely used for boring materials other than titanium. In addition, the guidance obtained with the aid of the bit makes it possible to obtain good geometry of the hole and in particular to limit the deviations relative to the boring axis.

According to a particular embodiment of the invention, the deep hole boring head of the invention also comprises pads that are integral with the body and that protrude from the outer lateral periphery of the latter, the distance between the outer face of these pads and the central axis being less than the distance between the central axis and the outer lateral edge of the cutting edge furthest from this axis.

These pads should not be confused with the guide pads used in the prior art, because these pads in no way guide the boring head, the latter function rather being entirely performed by the pilot drill bit. The pads mounted on the boring head of the invention are useful once boring is complete, as the boring head is being removed from the hole made, and prevent the outer lateral edge of the cutting edge furthest from the central axis of the boring head from deeply scoring the walls of this hole. For this purpose, these pads are positioned on the body of the boring head so that this head can press on at least one of these pads as it is being removed. The weight of the boring head may therefore be distributed between the pad and the cutting edge, so that any pressure exerted by the cutting edge on the walls of the hole is lessened and the score marks made may be easily rectified during a subsequent machining step. These pads may also be useful in the event of breakage of one of the elements of the cutting head (usually one of the cutting elements forming the said cutting edges), to limit the zones of contact between the head and the walls of the hole bored and thus protect these walls.

This difference of functionality between the pads of the invention and the known guide pads also means that different materials are used and that the pads of the invention protrude only by a small distance from the periphery of the body of the boring head, which makes it possible to prevent any sticking phenomenon. The pads of the invention are made for example of bronze, a low cost material so that their replacement does not generate major expenditure.

A further subject of the invention is a deep hole boring method for boring a production piece, which comprises a boring head of the type previously described, a rotary drive shaft attached to the said boring head, and means for rotating the drive shaft.

This method can be used to bore a production piece made of titanium, with a ratio L/D between the depth L of the hole made in this piece and the diameter D of the latter, greater than or equal to 10, the diameter D preferably being greater than or equal to 65 mm. For example, it has been possible to bore in a titanium workpiece a hole 180 mm in diameter D and 3400 mm in length, making an ratio L/D greater than 18.

BRIEF DESCRIPTION OF THE DRAWINGS

The invention will be well understood and its advantages will be clearer on reading the following detailed description of embodiments of the invention represented as non-limiting examples.

The description refers to the appended drawings in which.

DESCRIPTION OF THE PREFERRED EMBODIMENTS

Figure 1:
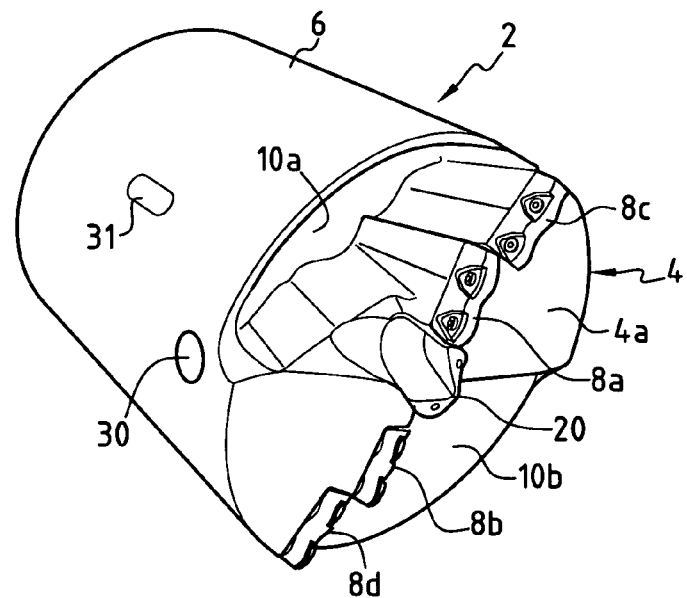
FIG. 1 represents a view in perspective of the deep hole boring head of the invention.

With reference to FIGS. 1, 2, 2a and 3, a description will now be given of an example of a boring head according to the invention.

According to this particular embodiment, the boring head comprises a body 2 which has a front part 4 and a rear part 6. This boring head is intended to be rotated about the central axis A-A. The weight of the boring head is distributed so that the centre of gravity of this piece corresponds to the central axis A-A of rotation, which prevents any imbalance.

The general shape of the body 2 has a symmetry of revolution relative to the central axis A-A. More precisely, the front part 4 of the body 2 has a generally frustoconical shape widening towards the front, and the rear part 6 has the general shape of a hollow cylinder of external diameter E.

The front face 4a of the front part 4 usually has at least one cutting edge formed by at least one cutting tip mounted on the front part 4. In the example, the front face 4a has four cutting edges 8a, 8b, 8c and 8d. These cutting edges are substantially perpendicular to the central axis A-A and situated at staggered distances from this axis (naturally it is radial distances that are meant here) and such that the zones swept by these cutting edges during the rotation of the body 2 partly overlap. In order of distance from the central axis A-A, the cutting edges are 8a, 8b, 8c and 8d.

Each cutting edge is formed by two removable cutting tips 7 that are adjacent but not necessarily contiguous. More precisely, in the example, each pair of cutting tips 7 is mounted on a removable support, hereinafter called a cassette 9, mounted on the front part 4. These cassettes 9 may be mounted on the front part 4 at different heights or different degrees of inclination. After having adjusted the positioning of the cassettes, no additional adjustment is necessary to mount the cutting tips 7 on these cassettes 9, because the housings made in the cassettes 9 and intended to receive the said tips 7 are adjusted to the dimensions of the latter. The cassettes and the tips are attached to one another and to the boring head by screwing or by any other means. The choice of the type of cutting tip 9 (shape, material, etc) to be used is based mainly on the material of the piece to be bored and is within the capabilities of those skilled in the art. For the deep hole boring of titanium, carbide cutting tips are preferably chosen.

It will be noted that the tangents to the cutting edges may be slightly inclined relative to the plane perpendicular to the central axis A-A to make boring easier and, in particular, that the tangent to the cutting edge 8c may be inclined at an angle "x" of between 0 and 5°, preferably between 1 and 3° relative to the tangent to the cutting edge 8a, which makes it easier to clear away the chips.

Figure 3:
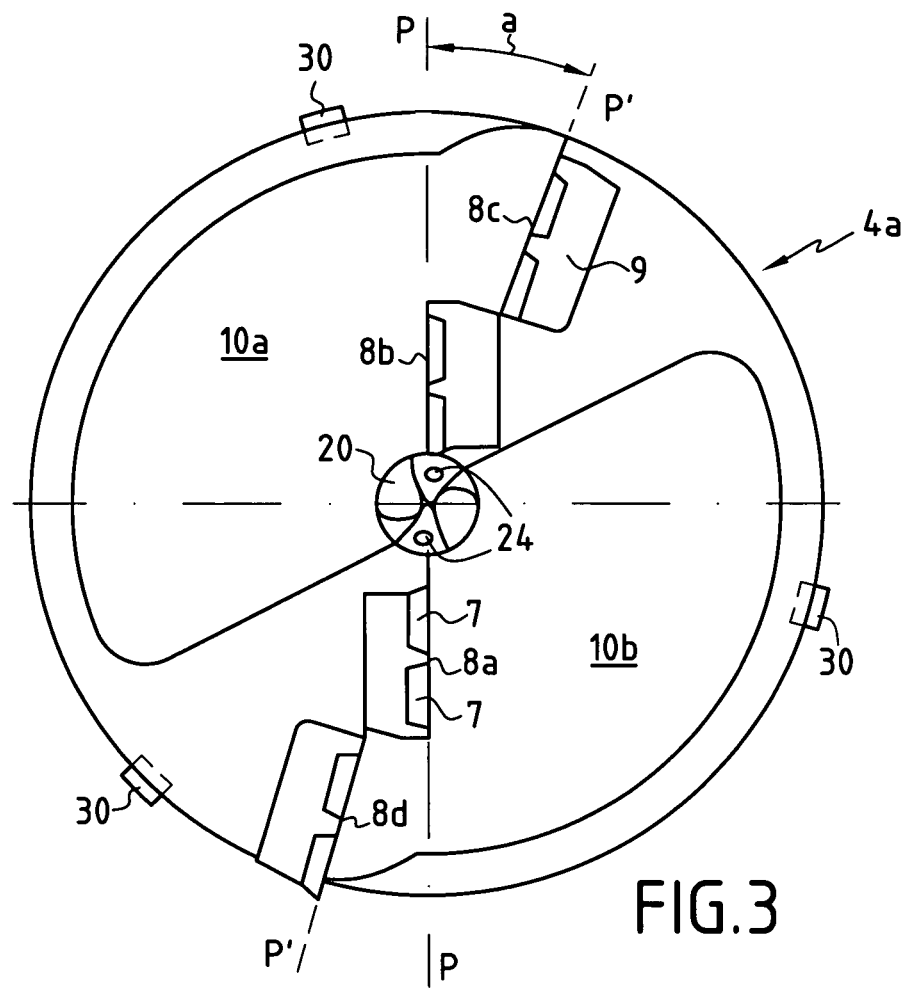
FIG. 3 is a front view of the deep hole boring head of FIG. 1.
Figure 2A:
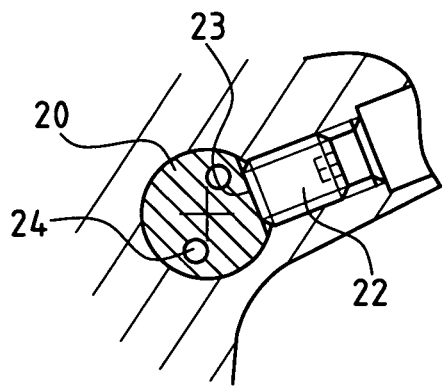
FIG. 2a is a section on the plane IIA-IIA of FIG. 2, of a detail of the deep hole boring head of FIG. 1.

In the example, the cutting edges 8a and 8b are situated substantially in one and the same plane P-P containing the central axis A-A shown in FIG. 3, while the cutting edges 8c and 8d are situated substantially in another plane P'-P' also containing the central axis A-A, which generally forms with the plane P-P an angle "a" of between 5 and 30°, and preferably between 10 and 20°, the value 15° having been adopted for a boring head used to bore a 185 mm diameter hole in a titanium piece. It has been found that this range of values of the angle "a" makes boring easier. In particular, it is noted that the clearing of the chips is made easier, the boring speed is higher and that there is less wear of the cutting edges.

Figure 2:
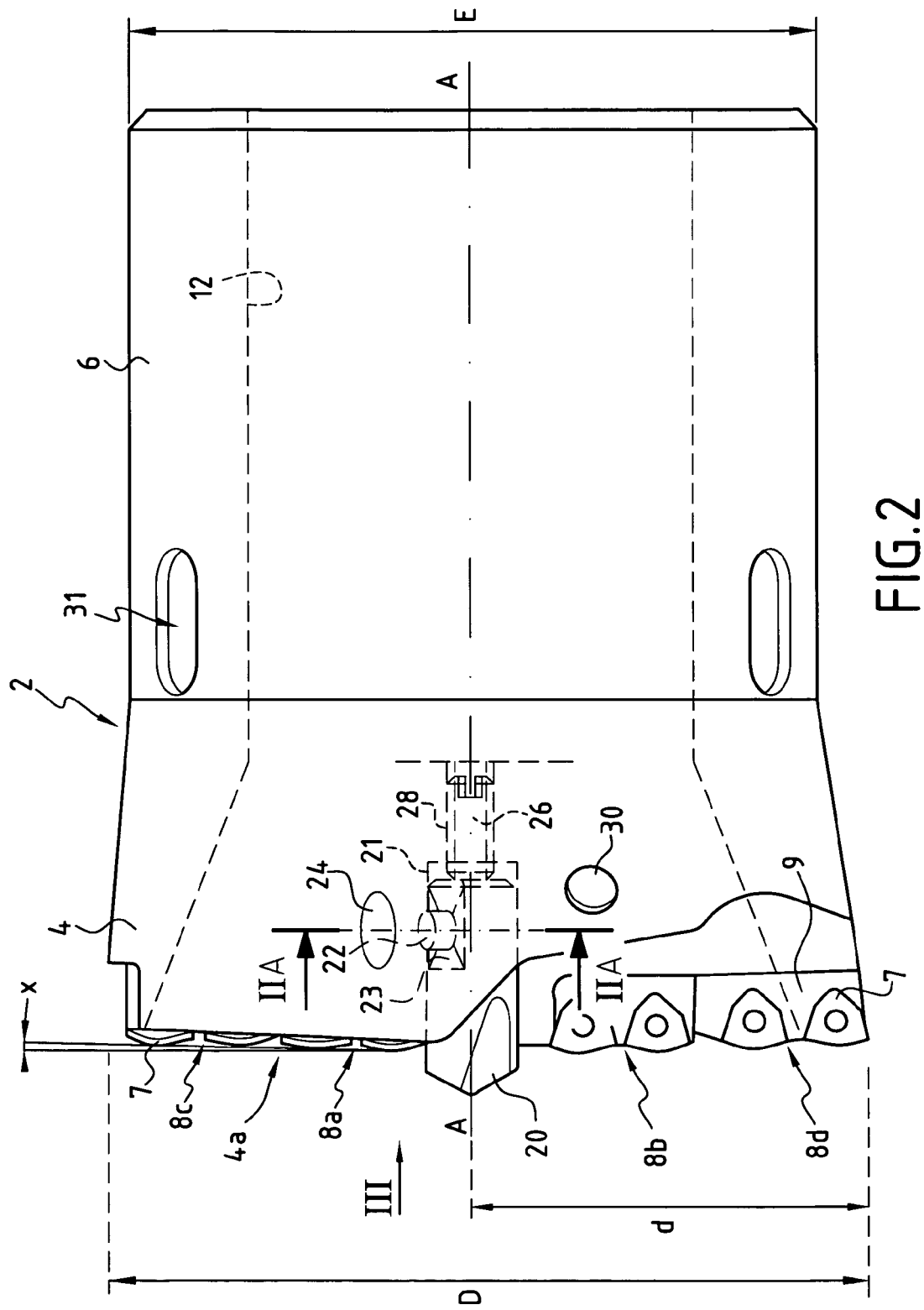
FIG. 2 is a side view of the deep hole boring head of FIG. 1.

As can be seen in FIGS. 1, 2 and 3, the cutting edges 8a to 8d are followed by recesses 10a and 10b which lead to a duct 12 inside the body 2 which is formed in the front part 4 and which extends into the rear part 6. This duct 12 is used to clear away rearwards the chips formed during boring.

A description will now be given of the pilot drill bit 20 situated at the center of the front face 4a of the deep hole boring head. This pilot drill bit is removable and the deep hole boring head of the invention comprises means of preventing this pilot drill bit 20 from turning, and also comprises means of adjusting the distance d' by which the pilot drill bit 20 protrudes. The distance of protrusion d' being the distance by which the drill bit 20 protrudes ahead of the cutting head furthest forward of the body 2.

The drill bit 20 is housed in a housing 21 provided for this purpose at the center of the front face 4a of the head 2. It is held in this housing 21 with the aid of the attachment means which include a clamping screw 22 housed inside a bore (preferably transverse to the housing 21) which leads from the said housing 21 to the outer lateral periphery of the front part 4 of the body 2, thus forming an opening 24 making it possible to gain access to the head of the screw 22. The bore has, in the vicinity of the housing 21, an internal thread into which it is possible to screw the screw 22. Tightening the screw 22 tightens the drill bit 20 between the screw 22 and the wall of the housing 21 being situated facing this screw, in order to prevent it from turning. To facilitate fixing of the screw 22 in position, the drill bit 20 may have a flat 23. It will be noted that the aforementioned turning-prevention means also serve as means for attaching the screw 22 to the body 2. Any other means of preventing turning, such as a pin or a groove/rib system, could be envisaged.

The means of adjusting the protrusion distance d' of the pilot drill bit 20 comprise for their part, in the example shown, a set screw 26. This screw 26 is screwed into an internal thread 28 made in a bore arranged in the front part 4 of the head 2 and leading from the bottom of the housing 21 to the duct 12 inside the body 2. The pilot drill bit 20 rests on the end of the stem of the screw 26, this end protruding at the bottom of the housing 21. The tightening/loosening of the screw 26 is thus used to vary the distance d', before the bit is tightened using the screw 22.

It is advantageous to have the pilot drill bit protrude ahead of the cutting edge furthest forward of the body 2, by a distance d' of between 1% and 20% of the distance d between the central axis and the outer lateral edge of the cutting edge furthest from this axis. This distance d' by which the outer part of the pilot drill bit extends must be sufficient to ensure a good guidance and must not be too great so as to limit the risks of the drill bit buckling or breaking. Thus, for a boring diameter D of 185 mm, a distance d' of for example between 8 and 10 mm should be chosen, that is approximately between 8 and 11% of the distance d between the central axis and the outer lateral edge of the cutting edge furthest from this axis, here equal to 185/2=92.5 mm.

Furthermore, advantageously, the radius of the pilot drill bit 20 is at most equal to a fifth (b 20%) of the distance d between the central axis A-A and the outer lateral edge of the cutting edge furthest from this axis. The reason for this is that, the diameter of the pilot drill bit 20 must ensure a sufficient bearing surface of the bit to ensure the guidance of the boring head, while remaining sufficiently small to limit the zone of action of the drill bit, the latter mainly playing a role of guiding the head and not of boring (although it participates therein). For a distance d of 92.5 mm, 15 mm may be chosen for example as the radius of the drill bit 20.

The front end of the pilot drill bit may have various shapes. The literature on the various possible shapes of pilot drill bits in the boring field is abundant, so those skilled in the art may refer thereto. In the present case, it has been found that a of a simple shape front end, substantially pointed, gives good guidance results and easily penetrates into the production piece.

According to a particular embodiment of the pilot drill bit, the latter may have at least one channel 24 which traverses it longitudinally and inside which a cutting fluid will be able to flow. The drill bit 20 shown in FIG. 2 has two channels 24 which lead to the front and rear ends of the bit and which are substantially symmetrical relative to the central axis A-A which is, of course, also the axis of rotation of the bit 20.

The structure of the deep hole boring head 2 of the invention being well understood, a description will now be given of the operation of a deep hole boring tool fitted with such a head, with reference to FIGS. 4 and 5.

Irrespective of the chosen embodiment, a deep hole boring tool according to the invention usually comprises a rotary drive shaft, attached to the boring head, and means for rotating the said drive shaft. The boring head 2 may be mounted on the shaft 40 by any appropriate means. For example, the end of the shaft 40 may have an outer thread capable of interacting by screwing with an internal thread inside the rear part 6 of the body 2.

Naturally, the means of rotating the shaft 40 must be capable of developing a sufficient torque to carry out the deep hole boring.

To clear away the chips cut from the production piece, a boring fluid is used, preferably a fluid of the undiluted oil type or oil that is soluble between 10 and 15%. This boring fluid is injected so that it reaches the bottom of the bored hole. As shown in FIGS. 4 and 5, it is possible to envisage two possible injection methods.

Figure 4:
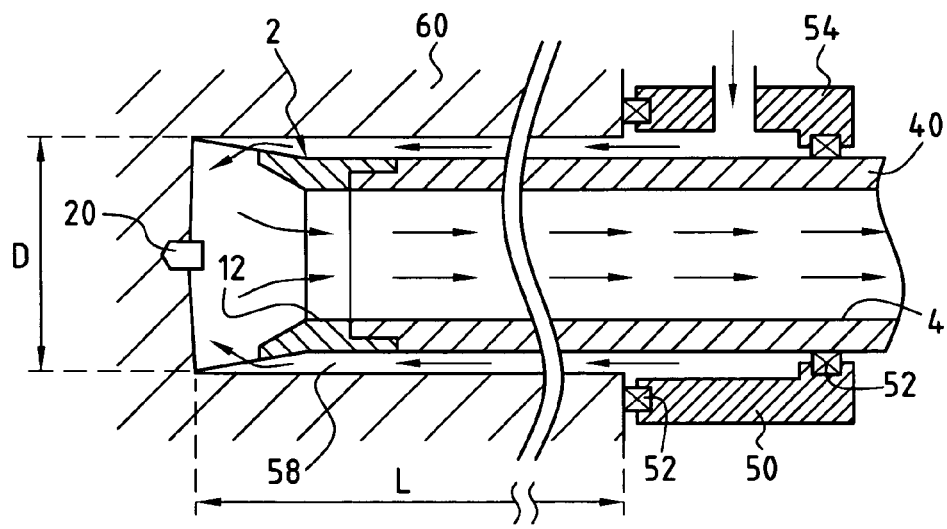
FIG. 4 is a schematic representation of a first type of deep hole boring tool according to the invention.

With reference to FIG. 4, the boring fluid may be injected into an injection chamber 50 formed between a sleeve 54 and the shaft 40 or the boring head. The sleeve 54 is placed around the shaft 40 (or the boring head) and in contact with the production piece 60. Leakage between the chamber 50 and the exterior is prevented by being sealed by seals 52 placed between the sleeve 54 and the piece 60 and between the sleeve 54 and the shaft 40. Since the maximum external diameter of the front part 4 of the body 2 is greater than that of the rear part 6 of the body 2, and greater than that of the drive shaft 40, there remains an annular space 58 delimited on one side by the outer wall of the rear part 6 and the shaft 40 and on the other by the inner wall of the hole formed. This annular space 58 communicates with the injection chamber 50 so that the injected fluid passes along the annular space 58 to reach the bottom of the bored hole. The chip-laden fluid is then cleared away through the duct 12 inside the body 2 and through the duct 44 inside the hollow drive shaft 40. Openings 31 may be made in the outer wall of the body to facilitate the circulation of the fluid.

Figure 5:
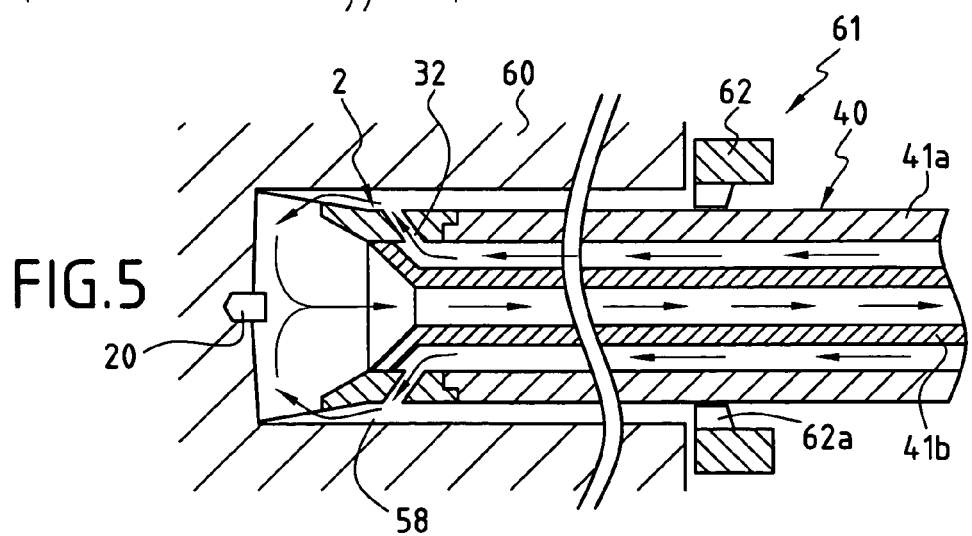
FIG. 5 is a schematic representation of a second type of deep hole boring tool according to the invention.

According to a second embodiment, with reference to FIG. 5, the drive shaft 40 is formed of two concentric hollow cylinders 41a and 41b. The "incoming" boring fluid is then injected between the inner cylinder 41b and outer cylinder 41a and the "outgoing" fluid is cleared away with the chips through the inside of the inner cylinder 41b. To limit turbulence at the boring head, it is possible to make the front end of the inner cylinder 41b flared and protruding beyond the front end of the outer cylinder 41a, so as to guide the "incoming" fluid towards the openings 32 that are made in the outer wall of the body 2 of the boring head and that lead into the annular space 58.

The deep hole boring of the piece 60 takes place as follows. First, the tool is positioned relative to the production piece. For this, a pilot hole intended to receive, at least partially, the pilot drill bit 20 may be used. Use may also be made of a guide ring 61 attached to the piece 60 which will be used to guide the tool at the beginning of boring, and if necessary thereafter, as an addition to the guidance given by the pilot drill bit. Such a ring 61 is shown in FIG. 5 and comprises an annular piece 62 which surrounds the tool and which has fins 62a distributed regularly over its inner face and on which the tool will be able to bear.

Then, the tool is rotated. The pilot drill bit 20 will then be the first to penetrate the piece 60 to establish a secondary hole of reduced diameter in the center of the primary hole that the user requires to bore. This secondary hole is used to guide the deep hole boring head during its forward travel, while ensuring that its central axis A-A does not deviate from the boring axis. In addition, the pilot drill bit 20, once it has entered the production piece 60, steadies the boring head and prevents, for example, any shaking of the rotary driving means from being transferred to the boring head. Thus, thanks to the invention, deviations relative to the boring axis and more generally faults in the geometry of the hole made can be significantly reduced.

Once boring is finished, the tool is withdrawn from the hole. To prevent the outer edge of the cutting edge 8d from scoring the walls of this hole, bronze pads 30 are distributed on the outside of the front part 4 of the body 2. These pads 8d protrude slightly outside the body 2 so that the body can rest on the latter during withdrawal. The weight of the body 2 is not therefore fully transferred to the cutting edge 8d, which limits the depth of the score marks that this cutting edge may make on the walls of the hole. The shallow score marks that may nevertheless result from the removal of the tool may be rectified easily during a subsequent machining step. It will be noted that the pads are sufficiently recessed relative to the wall of the formed hole not to enter into contact with this wall during boring.

The invention claimed is:

1. A deep hole boring head configured for rotating about a central axis, comprising: a body; and a duct which is inside the body, said body having a front part which includes at least one cutting edge and at least one recess, said cutting edge being followed by the recess that leads to the duct wherein the duct allows chips formed during boring to be cleared away rearwardly, said deep hole boring head comprising at a front end thereof and at a center portion thereof a pilot drill bit which is removable from the front part of the body and which protrudes forwardly of the front part of the body, the pilot drill bit guiding the head during boring of a production piece, wherein said pilot drill bit also comprises a device configured for adjusting a distance by which the pilot bit protrudes forward of the body.

2. A deep hole boring head according to claim 1, wherein said cutting edge is formed by at least one cutting tip mounted on the front part of the said body.

3. A deep hole boring head according to claim 1, comprising a plurality of pads that are integral with said body and which protrude from an outer lateral periphery of said body, a distance between the outer face of said pads and a central axis of said body being less than a distance between the central axis and an outer lateral edge of the cutting edge furthest from the central axis.

4. A deep hole boring head according to claim 1, wherein the radius of the pilot drill bit is at most equal to 20% of a distance between the central axis and the outer edge of the cutting edge furthest from this axis.

5. A deep hole boring head according to claim 1, wherein the pilot drill bit protrudes forward of the cutting edge furthest forward of said body by a distance of between 1% and 20% of a distance between the central axis and the outer edge of the cutting edge furthest from this axis.

6. A deep hole boring head according to claim 1, wherein the pilot drill bit comprises a device configured for preventing said pilot drill bit from turning relative to the body.

7. A deep hole boring tool, which comprises a deep hole boring head according to claim 1, a rotary drive shaft, attached to said boring head, and a rotating device configured for rotating said drive shaft.

8. A deep hole boring method for boring a production piece, which comprises using a deep hole boring head according to claim 1, said head being rotatable and being guided, during boring, by said pilot drill bit which is first to penetrate into the production piece.

9. A deep hole boring method for boring a production piece according to claim 8, which comprises forming, before boring, a pilot hole for receiving, at least in part, said pilot drill bit.

10. A method of boring a production piece using the boring head according to claim 1, wherein a ratio between a depth of a hole made in the production piece and a diameter of the latter is greater than or equal to 10, and wherein the production piece is made of titanium.

11. The method according to claim 10 for boring a production piece, wherein said diameter of the hole made is greater than or equal to 65 mm.

* * * * *